(12) United States Patent
Mashimo (10) Patent No.: US 9,451,124 B2
(45) Date of Patent: Sep. 20, 2016

(54) IMAGE FORMING APPARATUS AND METHOD FOR RESTORATION PRINTING ON MASKED PRINT

(71) Applicant: KYOCERA Document Solutions Inc., Osaka (JP)

(72) Inventor: Takayuki Mashimo, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/881,486

(22) Filed: Oct. 13, 2015

(65) Prior Publication Data

US 2016/0112600 A1    Apr. 21, 2016

(30) Foreign Application Priority Data

Oct. 15, 2014 (JP) .................. 2014-210463

(51) Int. Cl.
| | | |
|---|---|---|
| H04N 1/387 | (2006.01) | |
| H04N 1/40 | (2006.01) | |
| H04N 1/44 | (2006.01) | |
| G06K 9/34 | (2006.01) | |
| G06K 15/02 | (2006.01) | |
| G06F 3/12 | (2006.01) | |
| H04N 1/21 | (2006.01) | |

(Continued)

(52) U.S. Cl.
CPC .......... *H04N 1/3872* (2013.01); *G06F 3/1218* (2013.01); *G06F 3/1222* (2013.01); *G06F 3/1238* (2013.01); *G06F 3/1239* (2013.01); *G06F 3/1242* (2013.01); *G06K 9/00456* (2013.01); *G06K 9/34* (2013.01); *G06K 15/4095* (2013.01); *G06T 7/004* (2013.01); *G06T 7/0081* (2013.01); *G06T 11/60* (2013.01); *H04N 1/00856* (2013.01); *H04N 1/2104* (2013.01); *H04N 1/3873* (2013.01); *H04N 1/3876* (2013.01); *H04N 1/40062* (2013.01); *H04N 1/4446* (2013.01); *H04N 1/444* (2013.01); *H04N 2201/0094* (2013.01); *H04N 2201/3246* (2013.01)

(58) Field of Classification Search
None
See application file for complete search history.

(56) References Cited

U.S. PATENT DOCUMENTS

| | | | | |
|---|---|---|---|---|
| 2007/0273722 A1* | 11/2007 | Sumi | ...................... | B41J 29/393 347/14 |
| 2009/0296995 A1* | 12/2009 | Shibuya | .................. | G06F 21/31 382/115 |
| 2013/0024769 A1* | 1/2013 | Sumida | .................... | G06F 17/00 715/255 |

FOREIGN PATENT DOCUMENTS

| | | |
|---|---|---|
| JP | 2008-028449 A | 2/2008 |
| JP | 2011-130306 A | 6/2011 |

*Primary Examiner* — Scott A Rogers
(74) *Attorney, Agent, or Firm* — Studebaker & Brackett PC (57) ABSTRACT

A region separating section performs region separation to separate image data targeted for security printing into a text region only containing text characters and picture regions other than the text region. A masking region selection receiving section receives a user selection of a picture region to be masked. A masking region replacing section replaces each selected picture region with a blank region to generate masked image data. A print control section prints a masked print based on the masked image data. For restoration printing on the masked print, a picture region restoration receiving section prompts a user to place the masked print on a manual feed tray and receives, for each blank region in the masked image data, a designation of a picture region corresponding to the blank region. The print control section performs printing on the masked print to print each designated picture region on the corresponding blank region.

4 Claims, 6 Drawing Sheets

(51) Int. Cl.
*G06K 9/00* (2006.01)
*H04N 1/00* (2006.01)
*G06K 15/00* (2006.01)
*G06T 7/00* (2006.01)
*G06T 11/60* (2006.01)

IMAGE FORMING APPARATUS AND METHOD FOR RESTORATION PRINTING ON MASKED PRINT

INCORPORATION BY REFERENCE

The present application claims priority under 35 U.S.C. §119 to Japanese Patent Application No. 2014-210463, filed on Oct. 15, 2014. The contents of this application are incorporated herein by reference in their entirety.

BACKGROUND

The present disclosure relates to image forming apparatuses and image forming methods.

Typical image forming apparatuses, such as copiers, multifunction peripherals, and printers, may have a masking function for printing a document classified as having a high security level (confidentiality level). With the masking function, a confidential document is printed with some parts (such as charts and tables) of the document masked according to the level of user authorization. With respect to such a print having masked parts, a user having appropriate authorization may desire to restore the masked information.

To respond to such a desire, a certain document printer generates confidentiality-level setting information based on operations by a user. According to confidentiality-level setting information, each of a plurality of image regions of an original document is assigned a plurality of confidentiality levels for various types of document operations. The document printer then embeds the confidentiality-level setting information as a watermark image in the document and prints the document with security levels embedded therein.

A document copier compliant with the document printer retrieves the confidentiality-level setting information embedded as a watermark image from data obtained by reading the document. The document copier then acquires an authorization level of a user from user management information according to input of user information and checks the authorization level against the confidentiality-level setting information to determine regions permitted to be copied or regions permitted to be decoded.

As above, the document printer generates a document embedded with a digital watermark that indicates a plurality of regions each with a plurality of confidentiality levels set for different types of document operations. Consequently, a single document implements both copy control and decryption control according to the authorization level of a user who received distribution of the document.

However, security printing that uses digital watermarking is not protected against a risk of information leakage through photographing a print with a camera phone.

To address the risk, a certain image forming apparatus masks some parts of a document and embeds, in each masked part, information specifying the location of original image data. This ensures the security of the masked part and prevents information leakages through a print per se or photographed image of the print.

SUMMARY

An image forming apparatus according to one aspect of the present disclosure includes a region separating section, a masking region selection receiving section, a masking region replacing section, a print control section, and a picture region restoration receiving section. The region separating section performs region separation to separate image data targeted for security printing into a text region that only contains text characters and one or more picture regions other than the text region, and detects, for each of the picture regions, location information defining a location of the picture region in the image data. The masking region selection receiving section displays in a selectable state one or more masking candidate regions corresponding to the one or more picture regions separated through the region separation and receives, through a selection of one or more of the masking candidate regions by a user, a selection of one or more picture regions each as a masking region to be masked. The masking region replacing section replaces each of the selected picture regions with a blank region to generate masked image data and stores each of the selected picture regions along with a corresponding piece of detected location information into a memory. The print control section performs printing to produce a masked print based on the masked image data. For execution of restoration printing on the masked print, the picture region restoration receiving section prompts a user to place the masked print on a manual feed tray and receives, for each of the blank regions in the masked image data, a designation of a picture region corresponding to the blank region. The print control section performs printing on the masked print fed from the manual feed tray such that each designated picture region is printed on the corresponding blank region in the masked print based on the designated picture regions and the pieces of location information corresponding to the designated picture regions.

An image forming method according to another aspect of the present disclosure involves: performing region separation to separate image data targeted for security printing a text region that only contains text characters and one or more picture regions other than the text region and detecting, for each of the picture regions, location information defining a location of the picture region in the image data; displaying in a selectable state one or more masking candidate regions corresponding to the one or more picture regions separated through the region separation and receiving, through a selection of one or more of the masking candidate regions by a user, a selection of one or more picture regions each as a masking region to be masked; replacing each of the selected picture regions with a blank region to generate masked image data and storing each of the selected picture regions along with a corresponding piece of detected location information into a memory; performing printing to produce a masked print based on the masked image data; and for execution of restoration printing on the masked print, prompting a user to place the masked print on a manual feed tray and receiving, for each of the blank regions in the masked image data, a designation of a picture region corresponding to the blank region. In the printing on the masked print fed from the manual feed tray, the method involves printing each designated picture region on the corresponding blank region in the masked print based on the designated picture regions and the pieces of location information corresponding to the designated picture regions.

DETAILED DESCRIPTION

The following describes an image forming apparatus and an image forming method according to an embodiment of the present disclosure for the purpose of clarifying the understanding of the present disclosure. The embodiment described below is one example embodying the present disclosure and not of a nature limiting the technical scope of the present disclosure. The letter "S" preceding a numeral in the flowcharts stands for "Step".

The following now describes an image forming apparatus as an example of the embodiment of the present disclosure. The image forming apparatus according to the present disclosure may for example be a multifunction peripheral (MFP) combining the functions of a facsimile machine, a copier, a scanner, and a printer.

Figure 1:
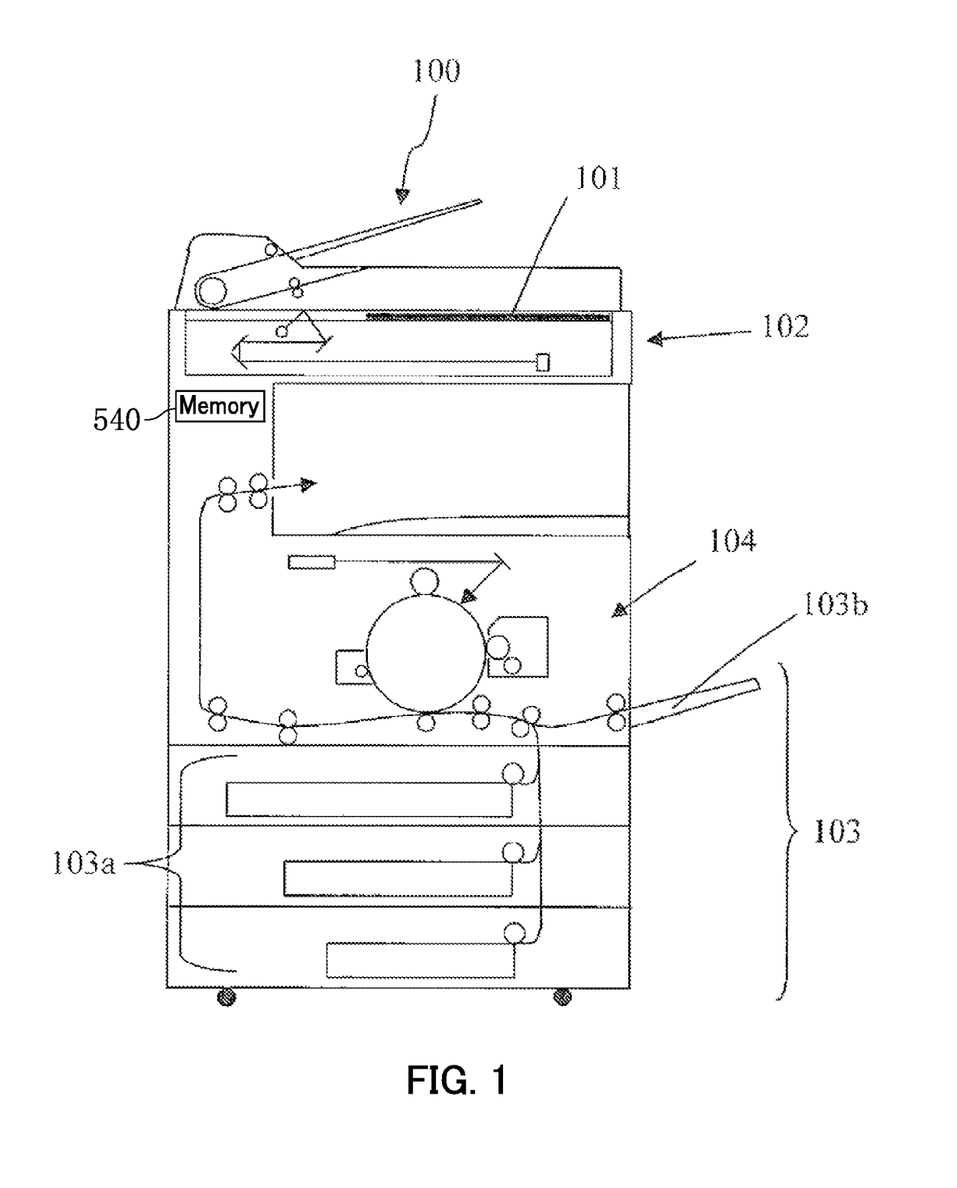
FIG. 1 is a conceptual diagram showing an overall internal structure of a multifunction peripheral according to the present disclosure including a display device.

As shown in FIG. 1, the MFP 100 includes an operation section 101, an image reading section 102, a conveyance section 103, an image forming section 104, and a memory 540. The conveyance section 103 includes a paper feed cassette 103a and a manual feed tray 103b.

When a user inputs settings for a print job on the operation section 101, the MFP 100 drives the relevant sections including the image reading section 102, the conveyance section 103, and the image forming section 104 to execute the print job. The operation section 101 is provided with a touch panel and receives input of user instructions and presents a screen display. The image reading section 102 reads a document placed on a document table or a document loaded in an automatic document feeder to acquire image data of the document. The conveyance section 103 conveys sheets from the paper feed cassette 103a or the manual feed tray 103b on which one or more sheets are placed in advance. The image forming section 104 carries out image formation by transferring a toner image formed according to the image data to a sheet being conveyed and fixing the toner image by a fixing roller.

Although not illustrated, the MFP 100 includes a control circuit that in turn includes a central processing unit (CPU), a read only memory (ROM), a random access memory (RAM), a hard disk drive (HDD), and drivers for the respective driving sections. The CPU, ROM, RAM, HDD, and drivers are all connected to an internal bus.

The CPU of the MFP 100 uses, for example, the RAM as a work area and executes programs stored on the ROM and/or HDD. According to the program execution result, the CPU transmits and receives data, instructions, signals, and instructions to and from the drivers, and controls operation of the driving sections related to a print job. Additionally, through execution of the programs, the CPU implements later-described sections other than the driving sections (see FIG. 2). For example, the ROM, RAM, and/or HDD store programs and/or data for implementing the sections, which will be described below.

Figure 2:
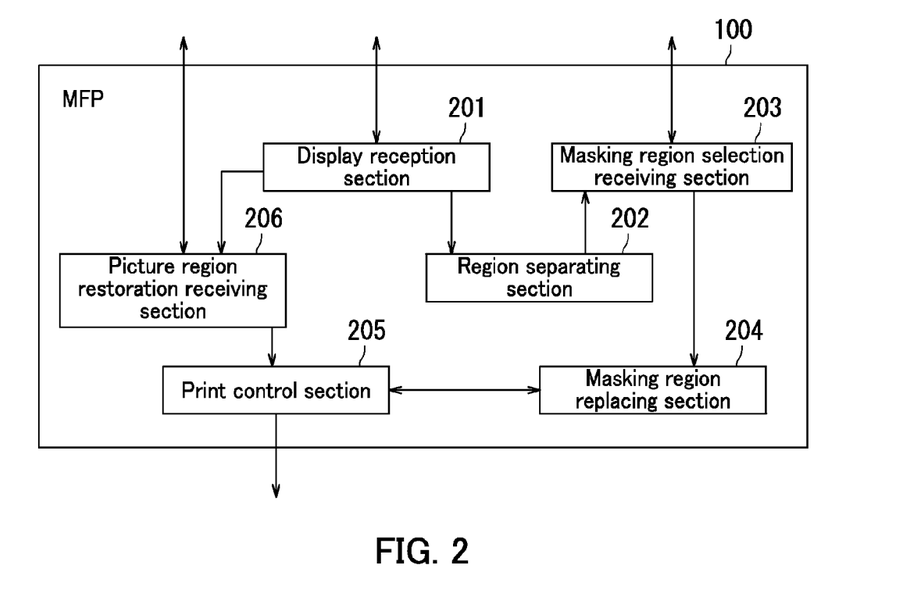
FIG. 2 is a functional block diagram of the multifunction peripheral according to the embodiment of the present disclosure.
Figure 3:
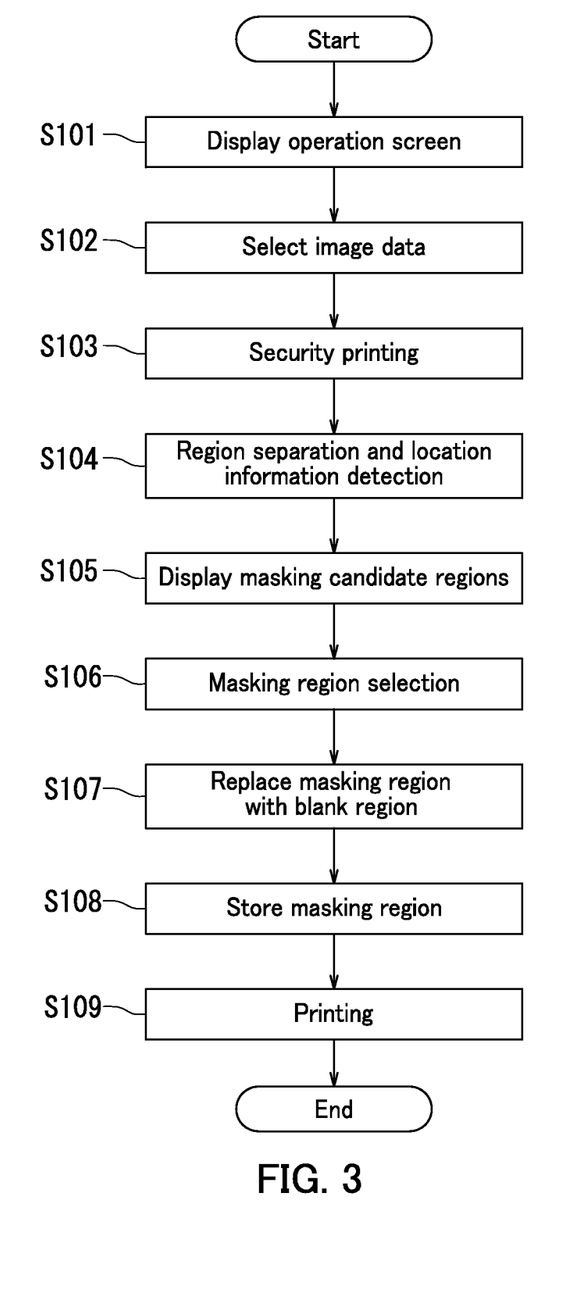
FIG. 3 is a flowchart of a procedure of security printing according to the embodiment of the present disclosure.
Figure 4:
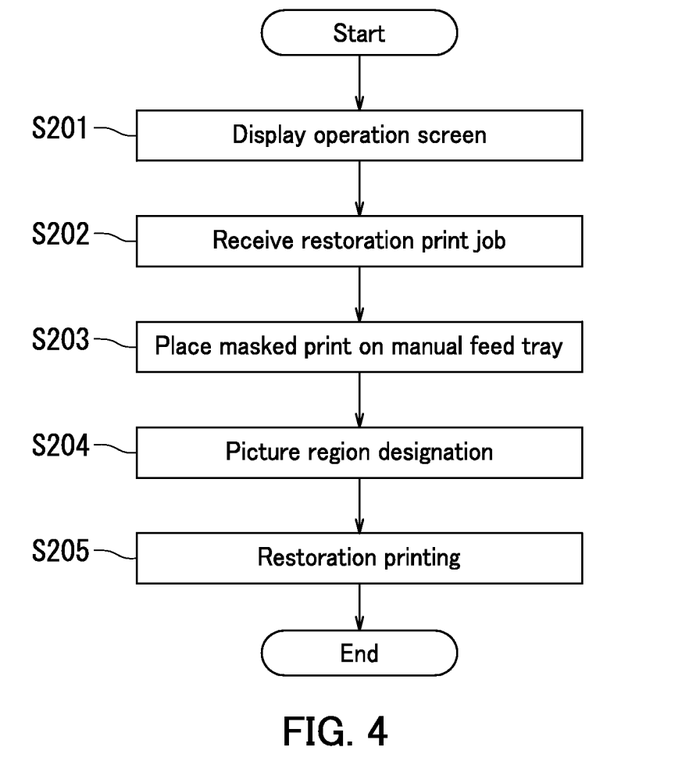
FIG. 4 is a flowchart of a procedure of restoration printing according to the embodiment of the present disclosure.

Next, with reference to FIGS. 2, 3, and 4, the following describes the structure and the execution procedure according to the embodiment of the present disclosure. First, the MFP 100 starts up when the user turns the power on. Then, a display reception section 201 displays an operation screen on the touch panel of the operation section 101 (FIG. 3: S101).

For printing a special document, which is a highly confidential document, the user operates the touch panel to select image data representing the special document stored in advance in the predetermined memory 540 of the MFP 100. In response, the display reception section 201 receives the selection of the image data (FIG. 3: S102).

Subsequently, the user operates the touch panel to input settings for a print job of the image data (for example, paper size A4) and select a security print key. In response, the display reception section 201 receives the print job as a security print job, along with the settings of the print job (FIG. 3: S103). The display reception section 201 notifies a region separating section 202 that the security print job is received. In response to the notification, the region separating section 202 performs region separation to separate image data targeted for the security printing into a text region composed only of text characters and one or more picture regions other than the text region and detects location information of each picture region in the image data (FIG. 3: S104). Security printing refers to printing of image data with part of the image data masked. In one example, parts of information in a document are masked in a print resulting from the security printing.

Figure 5A:
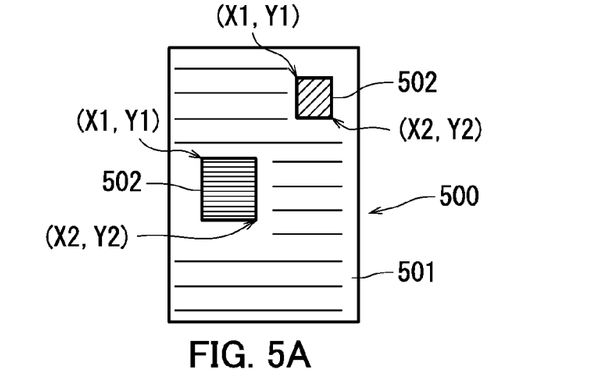
FIG. 5A shows an example of region separation of image data performed according to the embodiment of the present disclosure.

The method employed by the region separating section 202 for performing the region separation is not specifically limited. For example, as shown in FIG. 5A, the region separating section 202 may perform edge detection, edge gradient detection, and edge region detection on each pixel or each block of pixels of image data 500. Through the detections, the region separating section 202 performs region separation to separate the image data 500 into a text region 501 composed only of text characters and one or more picture regions 502 other than the text region 501. Note that a picture region 502, which is a region other than the text region 501, often contains a photograph, a table, or a chart, which is generally highly confidential. Therefore, through automatic detection of picture regions 502, the MFP 100 can automatically extract masking regions, which are regions to be masked in order to ensure the confidentiality. The region separating section 202 may perform the region separation to separate the image data 500 into a text region 501 and one or more picture regions 502 though one or more of edge detection, edge gradient detection, and edge region detection performed on each pixel or each block of pixels of the image data 500.

On detecting a picture region 502, the region separating section 202 also detects location information of the picture region 502 in the image data 500. In an example shown in FIG. 5A, on detecting picture regions 502 having a rectangular shape, the region separating section 202 detects coordinate information for each of the picture regions 502 detected which defines a rectangular region with a start point (X1, Y1) and an end point (X2, Y2).

On completion of the region separation, the region separating section 202 notifies a masking region selection receiving section 203 about the completion of the region separation. In response to the notification, the masking region selection receiving section 203 displays, in a selectable state, masking candidate regions that correspond one to one with the picture regions 502 acquired through the region separation (FIG. 3: S105). Through a selection of one or more of the masking candidate regions by a user, the masking region selection receiving section 203 receives one or more picture regions 502 as masking regions for which masking is instructed (requested) (FIG. 3: S106). In other words, the masking region selection receiving section 203 selects, as masking regions requested by the user to be masked, picture regions 502 corresponding to the masking candidate regions selected by the user. Note that a masking candidate region corresponds to a picture region 502 and the masking candidate region may be a reduced or enlarged image of the corresponding picture region 502.

Figure 5B:
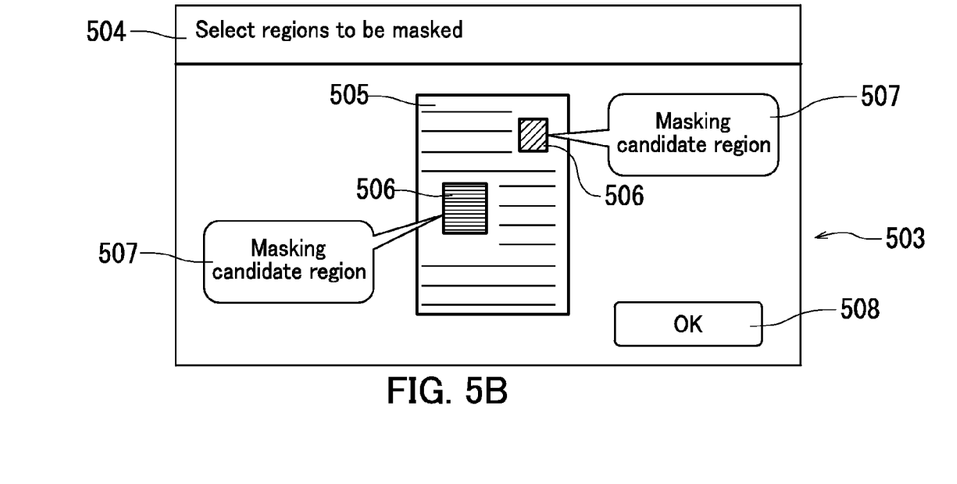
FIG. 5B shows an example of a masking region selection screen performed according to the embodiment of the present disclosure.

The method employed by the masking region selection receiving section 203 for the display and the reception is not specifically limited. For example, the masking region selection receiving section 203 displays, on the operation section 101, a masking region selection screen 503 as shown in FIG. 5B. In the masking region selection screen 503, the picture regions 502 acquired through the region separation are displayed as masking candidate regions. The masking region selection screen 503 includes: a message 504 reading "select masking regions"; a preview image 505 of the image data 500; one or more masking candidate regions 506 displayed in a selectable state in the preview image 505; a message 507 reading "masking candidate region" displayed, for each of the one or more masking candidate regions 506, in a balloon linked to the masking candidate region 506; and an OK key 508.

Through the display of the masking region selection screen 503, the MFP 100 presents the masking candidate regions 506 corresponding to the picture regions 502 (see FIG. 5A) to the user (FIG. 3: S105). The MFP 100 then allows the user to select pieces of image data to be masked in security printing, rather than indiscriminately masking all pieces of image data (FIG. 3: S106). This can improve usability.

On the masking region selection screen 503, the user selects, for example, all of the masking candidate regions 506 and selects the OK key 508. In response, the masking region selection receiving section 203 selects all the picture regions 502 corresponding to the masking candidate regions 506 as masking regions for which masking is requested (FIG. 3: S106).

On receiving the selection of the picture regions 502, the masking region selection receiving section 203 notifies a masking region replacing section 204 that the selection of the picture regions 502 is received. In response to the notification, the masking region replacing section 204 replaces each selected picture region 502 with a blank region (for example, a block of white background) (FIG. 3: S107) and stores the selected picture region 502 to the predetermined memory 540 along with location information detected for the selected picture region 502 (FIG. 3: S108). In Step S107, the masking region replacing section 204 replaces each selected picture region 502 in the image data 500 with a blank region (for example, a block of white background) to generate masked image data 550.

The method employed by the masking region replacing section 204 for the replacement and the storage is not specifically limited. In an example shown in FIGS. 5A and 6A, the masking region replacing section 204 deletes each selected picture region 502 from the image data 500 by replacing the selected picture region 502 with a blank region 600. This acquires the masked image data 550 in which each picture region 502 to be protected is masked for confidentiality. Specifically, the masked image data 550 thus includes one or more blank regions 600 and a text region 501.

The masking region replacing section 204 stores each picture region 502 corresponding to a blank region 600 into the predetermined memory 540 along with the location information defining the location of the picture region 502 in the image data 500 (for example, coordinate information defining a start point (X1, Y1) and an end point (X2, and Y2)).

The scheme employed for storing each picture region 502 is not specifically limited. In an example shown in FIG. 6A, the masking region replacing section 204 can store each picture region 502 and location information of the picture region 502 into the predetermined memory 540 according to a first storage scheme or a second storage scheme.

Figure 6A:
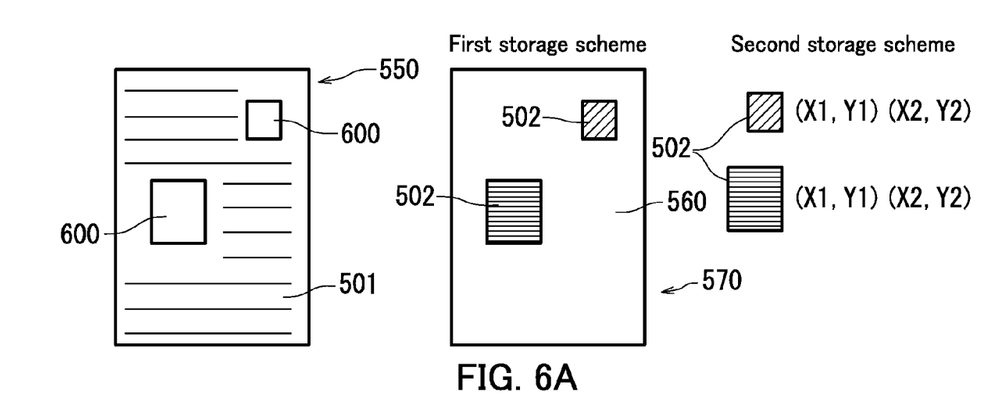
FIG. 6A shows an example of masked image data, a first storage scheme, and a second storage scheme according to the embodiment of the present disclosure.

According to the first storage scheme, restoration image data 570 is stored into the memory 540. The restoration image data 570 includes a blank region 560 and one or more picture regions 502 each at a location defined by a corresponding piece of location information. As shown in FIGS. 5A and 6A, the blank region 560 in the restoration image data 570 is a white background that is arranged to replace the text region 501 in the image data 500.

For example, the restoration image data 570 is generated by replacing the text region 501 of the image data 500 with the blank region 560 and placing the picture regions 502 each at a location defined by a corresponding piece of location information.

For example, the restoration image data 570 is generated using data representing a blank page of a size corresponding to the image represented by the image data 500 and placing each picture region 502 at a location defined according to a corresponding piece of location information.

In the second storage scheme, the picture regions 502 are stored into the memory 540 each in association with a corresponding piece of location information.

The first storage scheme and the second storage scheme differ from each other in terms of size of a prepared file. In view of this, the masking region replacing section 204 may prepare a file according to the first storage scheme and a file according to the second storage scheme and compare the file size to select the first or second storage scheme corresponding to the smaller file size. Then, the picture regions 502 and the location information of the picture regions 502 are stored into the memory 540 according to the selected storage scheme.

Upon completion of the storage, the masking region replacing section 204 notifies a print control section 205 about the completion of storage. In response to the notification, the print control section 205 performs printing to produce a masked print based on the masked image data 550 in which each picture region 502 is replaced by a blank region 600 (FIG. 3: S109).

Consequently, the security printing is executed to provide to the user a print having masked parts (that is a masked print). In addition, in the security printing, no printing is performed on the masked regions, which minimizes toner consumption.

The print control section 205 displays identification information used for restoration printing of the masked print that is printed according to the masked image data 550. The identification information may be in any form. For example, the print control section 205 may incorporate a barcode and/or a character string representing the identification information into a masked print. This allows the identification information to be presented to the user. Alternatively, the print control section 205 may display the identification information identifying the masked print on the operation section 101.

The following description is given for a case where a masked print is handed from the user to an administrator authorized to restore masked information in the masked print. First, when the administrator approaches the MFP 100, the display reception section 201 displays an operation screen on the touch panel of the operation section 101 (FIG. 4: S201).

In order to restore the masked print to obtain a print of the original special document (a print in which each picture region corresponding to a masked region is restored), the administrator operates the touch panel to input user identification information, such as a user identifier assigned to the administrator, and logs in as the administrator. Then, the administrator selects a key for a restoration print job of a masked print produced in security printing. In response to the key selection, the display reception section 201 receives a restoration print job of the masked print produced in the security printing (FIG. 4: S202) and notifies a picture region restoration receiving section 206 that a restoration print job is received. In response to the notification, the picture region restoration receiving section 206 prompts the administrator to place the masked print on the manual feed tray 103*b* (FIG. 4: S203) and receives designation of picture regions 502 each corresponding to a blank region 600 in the masked image data 550 representing the masked print (FIG. 4: S204).

The method employed by the picture region restoration receiving section 206 for prompting the administrator is not specifically limited. For example, the picture region restoration receiving section 206 may display, on the operation section 101, a message prompting the administrator to place a masked print that is a target for the restoration on the manual feed tray 103*b*. Having read the message, the administrator places the masked print on the manual feed tray 103*b*.

The method employed by the picture region restoration receiving section 206 for the reception is not specifically limited. For example, the picture region restoration receiving section 206 may display, on the operation section 101, a message prompting the administrator to input the identification information included in the masked print or the identification information that the administrator has been provided by the user. As a result, the administrator can input the identification information based on which the MFP 100 designates picture regions 502 corresponding to the blank regions 600 in the masked image data 550 representing the masked print. In other words, based on the identification information, the MFP 100 retrieves restoration image data 570 corresponding to the specific piece of masked image data 550.

Figure 6B:
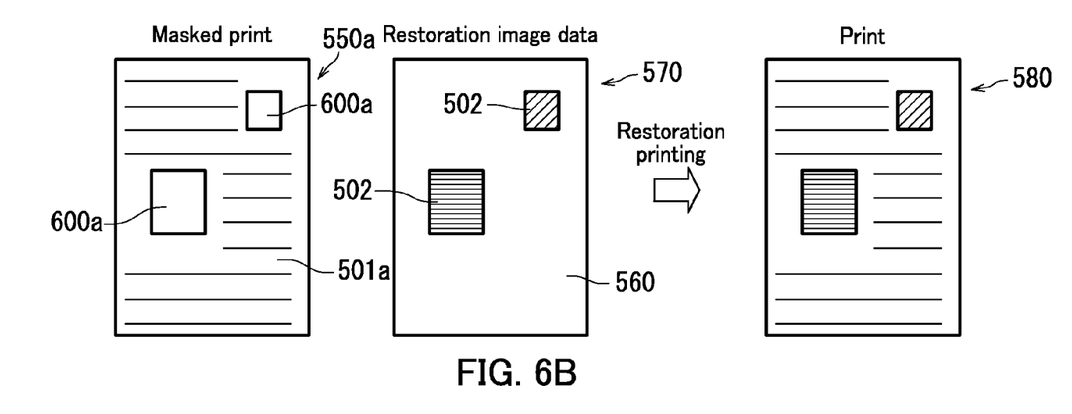
FIG. 6B shows an example of restoration printing performed to restore a masked image on a masked print according to the embodiment of the present disclosure.

In this case, as shown in FIG. 6B, the masking region replacing section 204 uses the first storage scheme and thus stores the restoration image data 570 into the memory 540 in association with the masked image data 550 representing the masked print 550*a*. The picture region restoration receiving section 206 is structured to receive designation of restoration image data 570 in response to the identification information input by the administrator. In other words, the picture region restoration receiving section 206 receives designation of picture regions 502 corresponding to the blank regions 600 in the masked image data 550 based on the identification information.

The masked print 550*a* includes a text region 501*a* and one or more blank regions 600*a*. The text region 501*a* is printed in conformity with the text region 501 of the masked image data 550 and each blank region 600*a* is printed in conformity with a corresponding blank region 600 of the masked image data 550.

In a case where the masking region replacing section 204 uses the second storage scheme, the picture region restoration receiving section 206 acquires, for each blank region 600 included in the masked image data 550, a corresponding picture region 502 and the location information of the picture region 502 from the memory 540.

The method employed to designate a picture region 502 corresponding to a blank region 600 in the masked image data 550 is not limited to the specific method described above. For example, the picture region restoration receiving section 206 displays image data that is stored in the memory 540 at the time of security printing. The image data is displayed in a selectable state as a candidate of masked image data. This allows the administrator to select a piece of image data containing picture regions corresponding to the blank regions in the masked image data. In this way, the masking region selection receiving section 203 receives the designation of picture regions.

Upon completion of the receiving, the picture region restoration receiving section 206 notifies the print control section 205 about the completion of the receiving. In response to the notification, the print control section 205 performs printing on the masked print 550*a* fed from the manual feed tray 103*b* such that each designated picture region 502 is printed on the corresponding blank region 600*a* based on the designated picture regions 502 and the location information of the picture regions 502 (FIG. 4: S205).

In a case where the masking region replacing section 204 uses the first storage scheme, the print control section 205 performs printing on the masked print 550*a* based on the restoration image data 570 such that the picture regions 502 are printed on the blank regions 600*a* as shown in FIG. 6B. Through the above, a restored print 580 is produced.

In a case where the masking region replacing section 204 uses the second storage scheme, the print control section 205 generates restoration image data from image data representing a blank page, by placing picture regions 502 each at a location defined by a corresponding piece of location information. The print control section 205 then prints picture regions 502 on the blank regions 600*a* of the masked print 550*a* based on the thus generated restoration image data. Through the above, the restored print 580 is produced.

The present embodiment produces a restored print 580 by overwriting the masked regions in a masked print 550*a* with the corresponding picture regions 502 in printing. Therefore, no additional sheet is required. The present embodiment can therefore produce a print while ensuring information security in a manner that minimizes the number of sheets and the amount of toner consumption. In addition, a masked print 550*a*, which is a product of initial printing, and a restored print 580, which is a product of secondary printing, do not exist as two separate prints. This eliminates an undesirable possibility of a user or administrator mixing up the prints.

As in the configuration described above, restoration printing may be permitted only to an administrator having specific authorization. That is, general users are not permitted to perform restoration printing, which effectively improves information security. In an alternative configuration, however, restoration printing may be permitted also to general users.

According to the embodiment of the present disclosure, the MFP 100 selects image data targeted for security printing from the memory 540, which should not be construed as limiting. For example, the MFP 100 may be communicatively connected to a terminal device, and a user may select image data stored on the memory of the terminal device. Then, a security print job of the image data may be transmitted to the MFP 100 for execution by the MFP 100.

Alternatively, image data targeted for security printing is not required to be stored on the memory of the MFP 100 or the memory of the terminal device. For example, the MFP 100 or the terminal device may be communicatively connected to a server having a memory storing image data. The MFP 100 or the terminal device then permits the user to select the image data stored on the server.

The embodiment of the present disclosure permits general users to perform security printing. However, an alteration may be made such that security printing is permitted only to the administrator having specific authorization. In such an alteration, the MFP 100 may be structured to perform user authentication based on user identification information, such as a user identifier, input by the user. Selection of the security print key is enabled only when the user has authorization that grants permission to perform security printing. Consequently, the MFP 100 can control execution of security printing and restoration printing according to the security authorization (level) of a user requesting a print job.

In addition, the MFP 100 may be structured to restrict selection of image data representing a highly confidential document according to the security authorization (level) of a user requesting a print job. For example, the MFP 100 may be structured to permit the administrator to select image data representing a highly confidential document in addition to image data of a document of a general security level and permit general users to select only image data of a general security level document.

The embodiment of the present disclosure is directed to the MFP 100 having the above-described sections. However, the present disclosure may be embodied by providing a recording medium storing a program for implementing the above-described sections. In such an embodiment, an image forming apparatus reads the program to implement the above-described sections. Thus, the program read from the recording medium produces the effects of the present disclosure. The present disclosure may be embodied as a method by storing steps performed by the above-described sections into a hard disk.

As has been described above, the image forming apparatus and the image forming method according to the present disclosure are applicable to MFPs as well as devices such as copiers and printers. The image forming apparatus and the image forming method according to the present disclosure produce a print in a manner that ensures confidentiality of information, by using a single sheet and a minimum amount of toner.

What is claimed is:

1. An image forming apparatus comprising:
    a region separating section configured to
        perform region separation to separate image data targeted for security printing into a text region that only contains text characters and one or more picture regions other than the text region, and
        detect, for each of the picture regions, location information defining a location of the picture region in the image data;
    a masking region selection receiving section configured to
        display in a selectable state one or more masking candidate regions corresponding to the one or more picture regions separated through the region separation and
        receive, through a selection of one or more of the masking candidate regions by a user, a selection of one or more picture regions each as a masking region to be masked;
    a masking region replacing section configured to
        replace each of the selected picture regions with a blank region to generate masked image data and
        store each of the selected picture regions along with a corresponding piece of detected location information into a memory;
    a print control section configured to perform printing to produce a masked print based on the masked image data; and
    a picture region restoration receiving section configured to, for execution of restoration printing on the masked print,
        prompt a user to place the masked print on a manual feed tray and
        receive, for each of the blank regions in the masked image data, a designation of a picture region corresponding to the blank region, wherein
    the print control section performs printing on the masked print fed from the manual feed tray such that each designated picture region is printed on the corresponding blank region in the masked print based on the designated picture regions and the pieces of location information corresponding to the designated picture regions,
    the masking region replacing section
        prepares, for storing the selected picture regions and pieces of location information corresponding to the picture regions, a file according to a first storage scheme and a file according to a second storage scheme,
        compares a file size of the file according to the first storage scheme and a file size of the file according to the second storage scheme, and
        stores the selected picture regions and the corresponding pieces of location information by using whichever is smaller out of the file according to the first storage scheme and the file according to the second storage scheme,
    according to the first storage scheme, restoration image data is stored, the restoration image data including a blank region arranged to replace the text region and the selected picture regions each arranged at a location defined by a corresponding piece of location information, and
    according to the second storage scheme, the selected picture regions are each stored in association with a corresponding piece of location information.

2. The image forming apparatus according to claim 1, wherein
    the region separating section performs the region separation by performing one or more of edge detection, edge gradient detection, and edge region detection on each pixel or each block of pixels of the image data.

3. An image forming apparatus according to claim 1, wherein
    the print control section presents identification information to be used in restoration printing of the masked print, and the picture region restoration receiving section receives the designation of a picture region based on the identification information.

4. An image forming method comprising:

performing region separation to separate image data targeted for security printing into a text region that only contains text characters and one or more picture regions other than the text region, detecting, for each of the picture regions, location information defining a location of the picture region in the image data;

displaying in a selectable state one or more masking candidate regions corresponding to the one or more picture regions separated through the region separation and receiving, through a selection of one or more of the masking candidate regions by a user, a selection of one or more picture regions each as a masking region to be masked;

replacing each of the selected picture regions with a blank region to generate masked image data and storing each of the selected picture regions along with a corresponding piece of detected location information into a memory;

performing printing to produce a masked print based on the masked image data; and for execution of restoration printing on the masked print, prompting a user to place the masked print on a manual feed tray and receiving, for each of the blank regions in the masked image data, a designation of a picture region corresponding to the blank region, wherein in the printing on the masked print fed from the manual feed tray, printing each designated picture region on the corresponding blank region in the masked print based on the designated picture regions and the pieces of location information corresponding to the designated picture regions, and the storing each of the selected picture regions includes:
　preparing, for storing the selected picture regions and pieces of location information corresponding to the picture regions, a file according to a first storage scheme and a file according to a second storage scheme;
　comparing a file size of a file according to the first storage scheme and a file size of a file according to the second storage scheme; and
　storing the selected picture regions and the corresponding pieces of location information by using whichever is smaller out of the file according to the first storage scheme and the file according to the second storage scheme, restoration image data is stored according to the first storage scheme, the restoration image data including a blank region arranged to replace the text region and the selected picture regions each arranged at a location defined by a corresponding piece of location information, and the selected picture regions are each stored in association with a corresponding piece of location information according to the second storage scheme.

* * * * *